United States Patent [19]
Crecelius

[11] Patent Number: 6,081,084
[45] Date of Patent: Jun. 27, 2000

[54] SENSORLESS POWER ANGLE CONTROL FOR A VEHICLE ALTERNATOR

[75] Inventor: David R. Crecelius, Noblesville, Ind.

[73] Assignee: Delco Remy America, Inc., Anderson, Ind.

[21] Appl. No.: 09/310,230

[22] Filed: May 12, 1999

[51] Int. Cl.[7] .................................................. H02P 5/06
[52] U.S. Cl. ........................ 318/254; 318/439; 318/145; 322/20; 322/22; 322/24
[58] Field of Search .................................. 318/145, 254, 318/439; 322/20, 22, 24

[56] References Cited

U.S. PATENT DOCUMENTS

| | | | |
|---|---|---|---|
| 4,399,397 | 8/1983 | Kleinschmidt, Jr. | 322/8 |
| 4,791,341 | 12/1988 | Brown et al. | 318/809 |
| 5,168,207 | 12/1992 | Follmer | 322/7 |
| 5,294,879 | 3/1994 | Freeman et al. | 322/22 |
| 5,378,979 | 1/1995 | Lombardi | 324/107 |
| 5,384,527 | 1/1995 | Rozman et al. | 322/10 |
| 5,510,696 | 4/1996 | Naidu et al. | 322/29 |
| 5,625,276 | 4/1997 | Scott et al. | 322/24 |
| 5,648,705 | 7/1997 | Sitar et al. | 318/145 |
| 5,739,652 | 4/1998 | Sriram | 318/439 |
| 5,764,021 | 6/1998 | Gutsche | 318/727 |
| 5,773,964 | 6/1998 | Peter | 322/20 |
| 5,793,167 | 8/1998 | Liang et al. | 318/141 |

*Primary Examiner*—Robert E. Nappi
*Assistant Examiner*—Rita Leykin
*Attorney, Agent, or Firm*—Ice Miller Donadio & Ryan; Jay G. Taylor; Russell E. Fowler, II

[57] ABSTRACT

An alternator having a sensorless power angle control includes a three phase stator winding and three stator winding outputs connected to a controlled full wave rectifier bridge with a dc output. The controlled full wave rectifier bridge includes upper MOSFET switches and lower MOSFET switches with body diodes. Operation of the alternator results in a three phase back EMF generated in the stator windings and phase voltages across each of the stator windings. The output of the alternator is increased by introducing a phase shift between the back EMF and the phase voltages, resulting in an optimized power angle. In order to provide a reference for the phase of the back EMF, a zero crossing detector is provided which monitors the zero voltage crossings across the body diodes of the lower MOSFET switches. The negative to positive zero voltage crossings across the body diodes of the lower MOSFET devices correspond to the negative to positive zero crossings of the three phase back EMF. With an indication of the zero crossings of the back EMF, the MOSFET switches of the controlled full wave rectifier bridge may be controlled to introduce a desired phase delay in each of the phase voltages. A phase delay between the back EMF and each of the phase voltages results in an optimized power angle and increased alternator output.

16 Claims, 8 Drawing Sheets

SENSORLESS POWER ANGLE CONTROL FOR A VEHICLE ALTERNATOR

BACKGROUND OF THE INVENTION

The present invention relates to the field of alternators, and particularly to the field of controlling alternator output.

Figure 1:
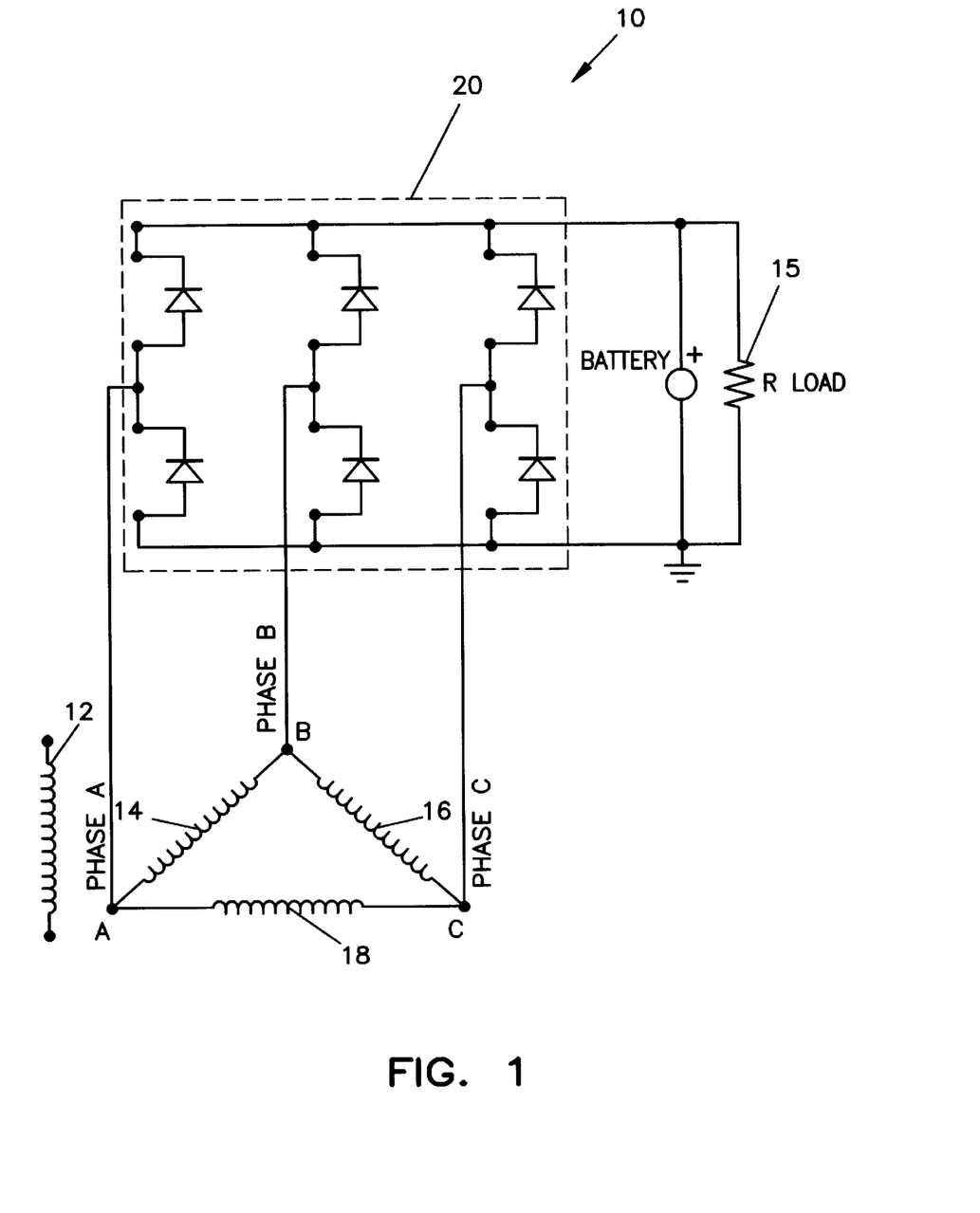
FIG. 1 is a schematic of a conventional alternator having a controlled bridge rectifier.

FIG. 1 shows a conventional alternating current generator, or "alternator" 10. The alternator comprises a rotor winding (the field winding) 12, three phase stator windings (delta or wye configured) 14, 16, and 18, and a three phase full wave controlled rectifier bridge 20 connected to the stator windings. The alternator is connected to a vehicle engine which turns a rotor (not shown) holding the field winding. Rotation of the field winding 12 causes AC power to be generated in each of the stator windings. Power generated in the stator windings is three phase power, represented by phase A, phase B, and phase C. Each phase is delivered to the full wave rectifier bridge 20 where it is converted into DC power for delivery to the vehicle load 15. A battery 30 is connected in parallel with outputs of the full wave rectifier bridge 20, for delivering adequate power to the load when the field winding is not rotating or when the field winding is rotating too slowly to result in a voltage equal to the battery voltage. When the field winding rotates at an increased speed, a voltage results across the battery terminals that is greater than the battery voltage, and the battery is re-charged.

When the vehicle engine is idling such that the field winding rotates at a decreased speed, the output of the alternator may not be adequate to supply all the power required by the load. When this occurs, the alternator is no longer regulating the system voltage. The battery is being discharged as it attempts to augment the generator output to meet the power demand at the loads. If this condition remains over an extended period of time the battery will become completely discharged.

The most common way to control the output of the alternator during engine idling and provide extra power for delivery to the vehicle load is to increase the rotor field flux. This may be accomplished by increasing the current through the field winding. If a greater current is delivered through the field winding, a greater voltage will be induced in the stator windings, and a greater output from the alternator will result as the engine idles and the rotor rotates at a slow speed. However, the amount of current that may be delivered to the field winding is limited by temperature concerns, as too much current flow through the field winding will cause the alternator to overheat.

Figure 2:
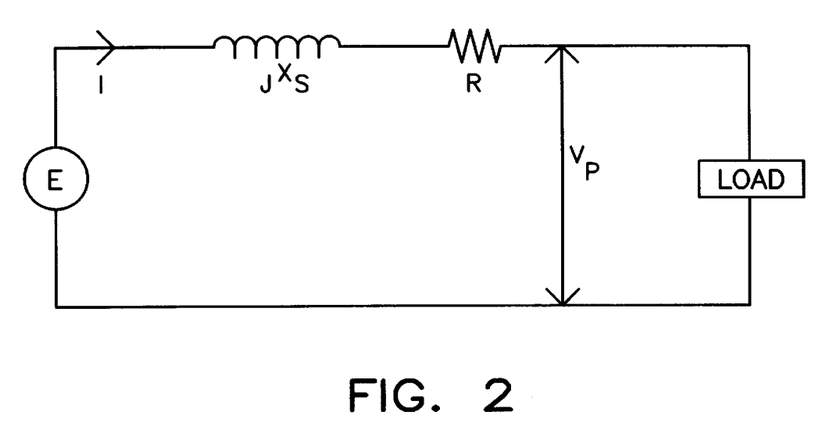
FIG. 2 is a schematic diagram of an equivalent circuit of a synchronous machine with a uniform air gap.

Another effective method for obtaining an increased output from the alternator during engine idling is to maximize the power angle. The power angle is defined as the phase difference between the back EMF generated in the stator windings and the phase voltage output from the stator windings. FIG. 2 shows a schematic diagram of an equivalent circuit of a synchronous electromagnetic machine having a uniform air gap, wherein: E is the back EMF generated in one of the stator windings by a rotating flux produced by the field winding; I is the phase current; R is the resistance of the stator winding; X is the reactance of the stator winding; and $V_P$ is the phase voltage output from the stator winding and delivered to the load.

Figure 3:
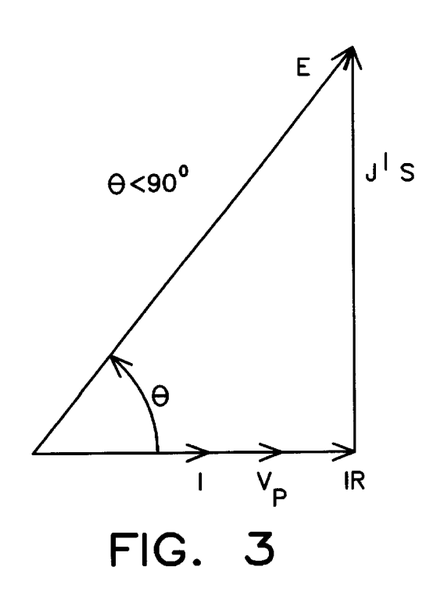
FIG. 3 is a phasor diagram illustrating an operating condition of the diode rectified synchronous machine of FIG. 1.
Figure 3A:
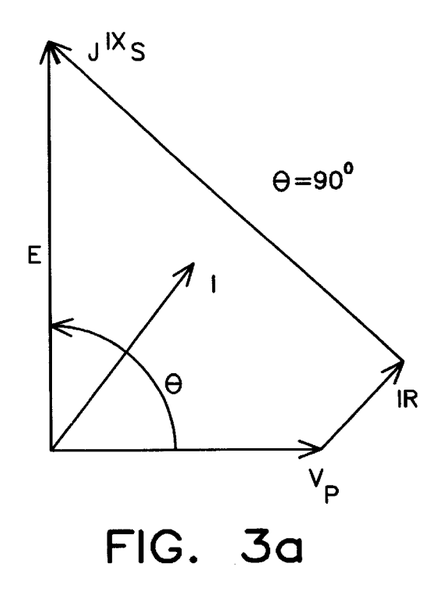
FIG. 3a is a phasor diagram illustrating an operating condition of a synchronous machine having an active bridge rectifier introducing a phase shift.

A phasor diagram of the circuit of FIG. 1 is shown in FIG. 3 with the power angle represented by θ. In a "passive" diode bridge (i.e., a rectifier bridge where only diodes are used) such as that shown in FIG. 1, the phase current and phase voltage are forced to be in the same phase relation. FIG. 3 demonstrates that when the phase voltage and phase current are forced to be in the same phase relation, it is not possible to achieve an optimal power angle such that the back emf and the phase voltage are orthogonal. However, if the passive diode bridge is replaced by a "controlled" or "active" transistor bridge (i.e., a rectifier bridge where the diodes are replaced by transistor switches), the phase voltage may be allowed to lag the phase current. A phasor diagram of an alternator having an active transistor bridge is shown in FIG. 3a. As can be seen from FIG. 3a, when the phase voltage is allowed to lag the phase current, the phase angle between the back EMF and the phase voltage (i.e., θ) may approach the optimal 90° mark. It has been demonstrated that the power output of an alternator at idle speeds can be increased by 45 to 50% by optimizing the power angle toward the 90° mark by advancing the phase angle of the phase voltage. For example, a 25° phase advance in the phase voltage may result in a 45% increase in generator output.

Thus, in order to control the power angle, a "controlled" rectifier bridge is used in place of a "passive" rectifier bridge. In a controlled rectifier bridge, the angle of the phase voltage can be controlled by turning the transistor switches on and off at selected times. If the angle of the back EMF is known, the angle of the phase voltage may be adjusted by the switches in the controlled rectifier bridge and a more optimal power angle may be introduced to the alternator. Unfortunately, it is difficult to obtain a direct reading for the back EMF generated in the stator windings. Without a machine reference for the back EMF, the optimal phase angle for the phase voltages can not be determined. Therefore, some method must be used to obtain an indication of the phase angle of the back EMF before the phase voltage is shifted by the controlled bridge rectifier.

Several methods for adjusting the power angle are disclosed in U.S. Pat. No. 5,793,167 to Liang et al. Many of these methods require sensors. In one method, a rotor position sensor is used to provide a back EMF reference. In another method, a current sensor is used to determine the phase current, and adjustment of the angle between the phase current and phase voltage affects the power angle. However, there are several disadvantages to any method that relies on sensors for establishing a machine reference for use in adjusting the power angle. In particular, sensors are often unreliable, add substantial costs to the alternator, and make the alternator larger and more difficult to package. Therefore, it would be advantageous to provide a simple and easy to implement sensorless method of determining a machine reference for use in controlling the power angle in an alternator.

SUMMARY OF THE INVENTION

An alternator of present invention comprises a field winding, stator windings, a controlled full wave rectifier bridge (i.e., an "active" bridge), and a dc output. The controlled bridge includes six separate MOSFET switching devices, each including a body diode. The switching devices include a set of upper devices and a set of lower devices. When in an active state, the switching devices of the controlled bridge are sequentially turned on and off by a microcontroller and a 3 phase gate driver in a six-step control fashion, as is known in the art. A zero crossing detector is positioned to accept voltage inputs from the body diodes of the lower devices. The zero crossing detector provides a signal to the microcontroller indicative of the zero voltage crossings for the body diodes of the lower switching devices.

In operation, the field winding begins to rotate upon starting of a vehicle engine. Rotation of the field winding produces a back EMF in each of the stator windings. Following resistive and inductance losses in each of the stator windings, a phase voltage is output from each of the stator windings. The phase voltages are full wave rectified by the controlled bridge to produce a dc output to the vehicle electrical load.

If the dc output is not sufficient to produce the required output power, the microcontroller adjusts the field current to a maximum value by controlling a transistor regulator. If the required power is still not achieved after increasing the field current to a maximum value, the microcontroller instructs the three phase gate driver to adjust the power angle.

To increase the power angle, the microcontroller must have a reference of the phase of the back EMF. This reference is provided to the microcontroller by the zero crossing detector. The zero crossing detector senses the voltages across the lower diodes in the diode bridge. The microcontroller uses these zero crossings as representations of the zero crossings of the back EMF. With a representation of the zero crossings of the back EMF, the micro-controller has a reference for the period and the exact phase of the back EMF, and a phase shift can be introduced between the phase voltage and the back EMF based upon this reference. Introduction of the phase shift is accomplished by adjusting the six step control sequence so that the time for turning on and off each switching device is delayed by a given amount. By introducing a delay into the six step control, a phase delay is introduced to the phase voltages resulting in a phase shift between the back EMF and the phase voltages, thus producing a desired power angle and greater power output. As an example, when the voltage across the diode in the lower switching device connected to phase B crosses zero, this represents a zero crossing of the phase A back EMF, and the micro-controller delays the phase of phase voltage AC. This phase delay will cause the power angle to increase toward 90 degrees and the output of the alternator will thus be increased. Accordingly, it is an advantage of the present invention to provide a novel method for controlling the power angle on a vehicle alternator which is free of sensors, and only uses a simple zero crossing circuit for determination of a machine reference of the phase of the back EMF.

The alternator may be operated in two basic modes. One mode is a "diode mode" where all of the MOSFETs are turned off and rectification is provided by the MOSFET body diodes. In this mode the rectifier operates as a standard diode bridge rectifier. Another mode is an active bridge mode" where the MOSFET switches are turned on and off at the same time as the diodes would be turned on and off. Thus, the active bridge mode operates similar to the diode mode, except the efficiency of the bridge rectifier is increased due to the lower conduction losses of the MOSFET. Also in the "active bridge mode", the MOSFET switching sequence may be slightly delayed to shift the power angle of the alternator, thus allowing the synchronous machine to generate more output at low speeds. The switching sequence is delayed by the microprocessor based upon the zero crossing information received from the zero crossing detector.

DETAILED DESCRIPTION

Figure 4:
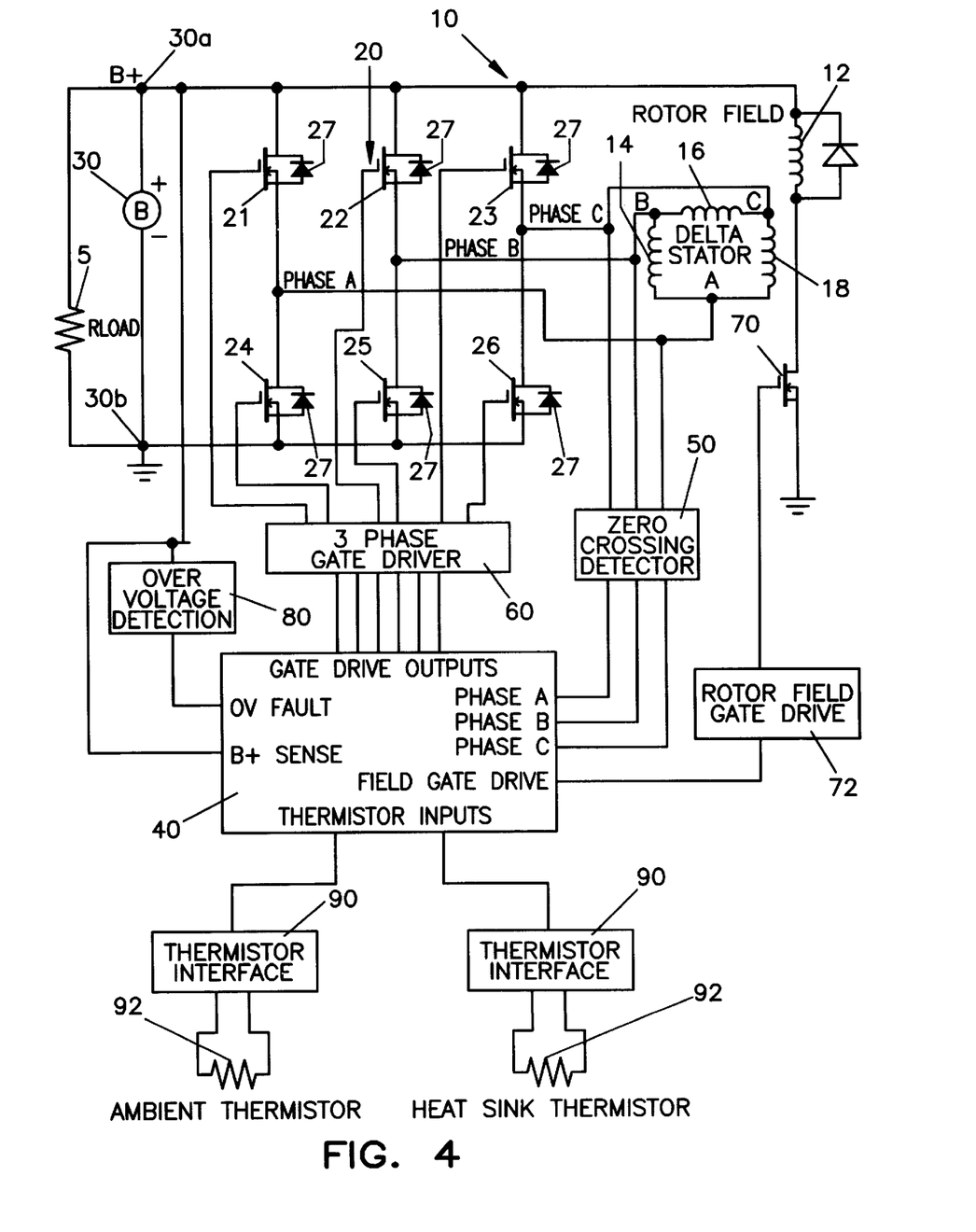
FIG. 4 is a schematic block diagram of an alternator having sensorless power factor control according to the present invention.

Referring to FIG. 4, a synchronous alternator 10 is shown having a field winding 12 and three delta connected stator windings 14, 16 and 18. The field winding 12 is part of a wound field rotor (not shown). The amount of current flowing through the field winding is controlled by a transistor regulator 70. The rotor is driven by an engine (not shown) at various speeds. Rotation of the rotor generates a three phase alternating electromotive force in the stator windings 14, 16 and 18. The electromotive force produced in each of the stator windings is termed the back EMF, and includes back EMF phase A, back EMF phase B, and back EMF phase C. The magnitude of the three phase back EMF generated in the stator windings is dependant both upon speed of rotor rotation and magnitude of the current flowing through the field winding 12. Following resistive and inductive losses which occur within the stator windings 14, 16, and 18, phase voltages are defined across each of the stator windings.

The stator windings 14, 16 and 18 have three outputs A, B and C, with phase voltages $V_{AB}$, $V_{BC}$ and $V_{CA}$ defining voltages across the windings and alternating current flowing through each of the three stator winding outputs A, B, and C. The stator outputs are connected to a full wave controlled bridge rectifier 20. The controlled bridge rectifier includes six MOSFET switches indicated by reference numerals 21–26. There are three upper MOSFET switches 21–23 and three lower MOSFET switches 24–26 which form three respective transistor pairs, each transistor pair including one upper MOSFET switch and one lower MOSFET switch. Output A of the stator windings is connected to the rectifier bridge between upper switch 21 and lower switch 24 which form the first transistor pair. Output B of the stator windings is connected to the rectifier bridge between upper switch 22 and lower switch 25 which form the second transistor pair. Output C of the stator windings is connected to the rectifier bridge between upper switch 23 and lower switch 26 which form the third transistor pair. Each MOSFET switch includes a body diode 27 connected across the MOSFET source and the MOSFET drain. The rectifier bridge receives an alternating current from the stator winding outputs A, B, and C and transforms the alternating current into direct current that is delivered to a vehicle load 15.

The MOSFET switches 21–26 of the rectifier bridge are controlled (i.e., turned on and off) by a standard three phase gate driver 60. The three phase gate driver 60 is capable of operating the MOSFET switches in two basic modes. The three phase gate driver receives signals from a microcontroller 40 which determines the mode in which the MOSFET switches will operate.

The first basic mode is a "diode mode" or "passive bridge mode". In this mode, the gate driver 60 turns all of the MOSFET switches off and the rectifier bridge 20 is driven by the body diodes 27 only. This causes the rectifier bridge to act as a standard passive rectifier bridge.

The second basic mode is the "active bridge mode". In the active bridge mode the MOSFET switches are turned on and off by the three phase gate driver using a six step control method to control the dc output from the bridge rectifier 20. When the MOSFET switches are selectively turned on and off, the MOSFET switches determine current flow instead of the body diodes. The six step control method results in a six step sinusoidal voltage in each of phase voltages $V_{AB}$, $V_{BC}$ and $V_{CA}$. To produce this result, the three phase gate driver 60 controls the MOSFET switches of the rectifier bridge such that three, and only three, of the MOSFET switches are on at any one time, and no upper and lower switches for the same phase (i.e., for the same transistor pair) are on at the same time. The switching sequence for the six step control is displayed in the following table:

| Step | Active MOSFETs |
|---|---|
| 1 | 21, 25, 23 |
| 2 | 21, 25, 26 |
| 3 | 21, 22, 26 |
| 4 | 24, 22, 26 |
| 5 | 24, 22, 23 |
| 6 | 24, 25, 23 |

One advantage of the active bridge mode over the diode mode is that the efficiency of the bridge rectifier is increased due to the lower conduction losses with the MOSFET switches. Another advantage of the active bridge mode is that a phase delay may be introduced to the phase voltages. To accomplish this, the turn off and turn on times for each of the MOSFET switches are delayed by an amount of time determined by the microcontroller or pre-programmed into the microcontroller. By delaying the turn on and turn off times for each of the MOSFET switches, the phase voltages are shifted in time by the amount of the delay, resulting in a phase shift for each of the phase voltages.

The microcontroller receives a plurality of inputs to determine the mode in which the alternator will operate. An over voltage detector 80 monitors the battery 30 voltage at the positive terminal 30a and provides an input to the microcontroller when a fault has occurred with the battery, such as a detached battery cable. In an over voltage situation, such as a detached battery cable, the inductive nature of the system causes a large voltage spike to be seen on the positive battery supply 30a. In this situation, the microcontroller immediately instructs the three phase gate driver 60 to operate the MOSFET switches in a "dump" mode. In the dump mode, all of the upper MOSFET switches 21–23 are turned off and all of the lower MOSFET switches 24–26 are turned on. With this arrangement, the energy in the voltage spike is dissipated through the alternator windings 14, 16 and 18, and does not damage the components of the alternator or load devices. The alternator may be designed with hardware (not shown) that immediately causes the alternator to operate in a "dump mode" should an over voltage situation occur.

The microcontroller also monitors the voltage of the battery 30 at terminal 30a. The voltage of the battery plays a role in determining the mode in which the alternator will operate, and particularly the amount of current that will be allowed to flow through the field winding 12 to regulate the battery voltage. The microcontroller is connected to a rotor field gate drive 72 which controls a voltage regulator 70. Based upon the voltage of the battery, the microcontroller sends instructions to the rotor field gate drive 72 to drive the regulator 70 and allow a desired amount of current to flow through the field winding 12. When increased current flows through the field winding 12, the output of the alternator is also increased. However, if too much current is generated in the stator winding, the alternator will begin to overheat. Thus, a plurality of thermistor interfaces 90 also provide inputs to the microcontroller 40 concerning the operating temperature of the alternator. The thermistor interfaces are connected to thermistors 92 which provide temperature information at various alternator locations, including heat sink temperature and ambient alternator temperature. When the microcontroller 40 detects that the alternator 10 is overheating, the field current will be limited in an attempt to cool the alternator.

The microcontroller 40 also receives inputs from a zero crossing detector 50 which influences operation of the rectifier bridge in the active bridge mode. The zero crossing detector 50 monitors the voltage across the body diodes 27 of the lower MOSFET switches. The zero crossing detector includes three inputs that connect the zero crossing detector 50 to each of the A, B and C outputs of the stator windings. The A, B and C outputs of the stator windings are common with the respective cathodes of the body diodes 27 for lower MOSFET switches 24–26. The zero crossing detector monitors the voltage between the body diodes 27 of the lower MOSFET switches 24–26 and ground. The zero crossing detector outputs three square wave signals to the microcontroller for one electrical revolution where one square wave signal represents the zero voltage crossings for each of the lower MOSFET body diodes.

Figure 5:
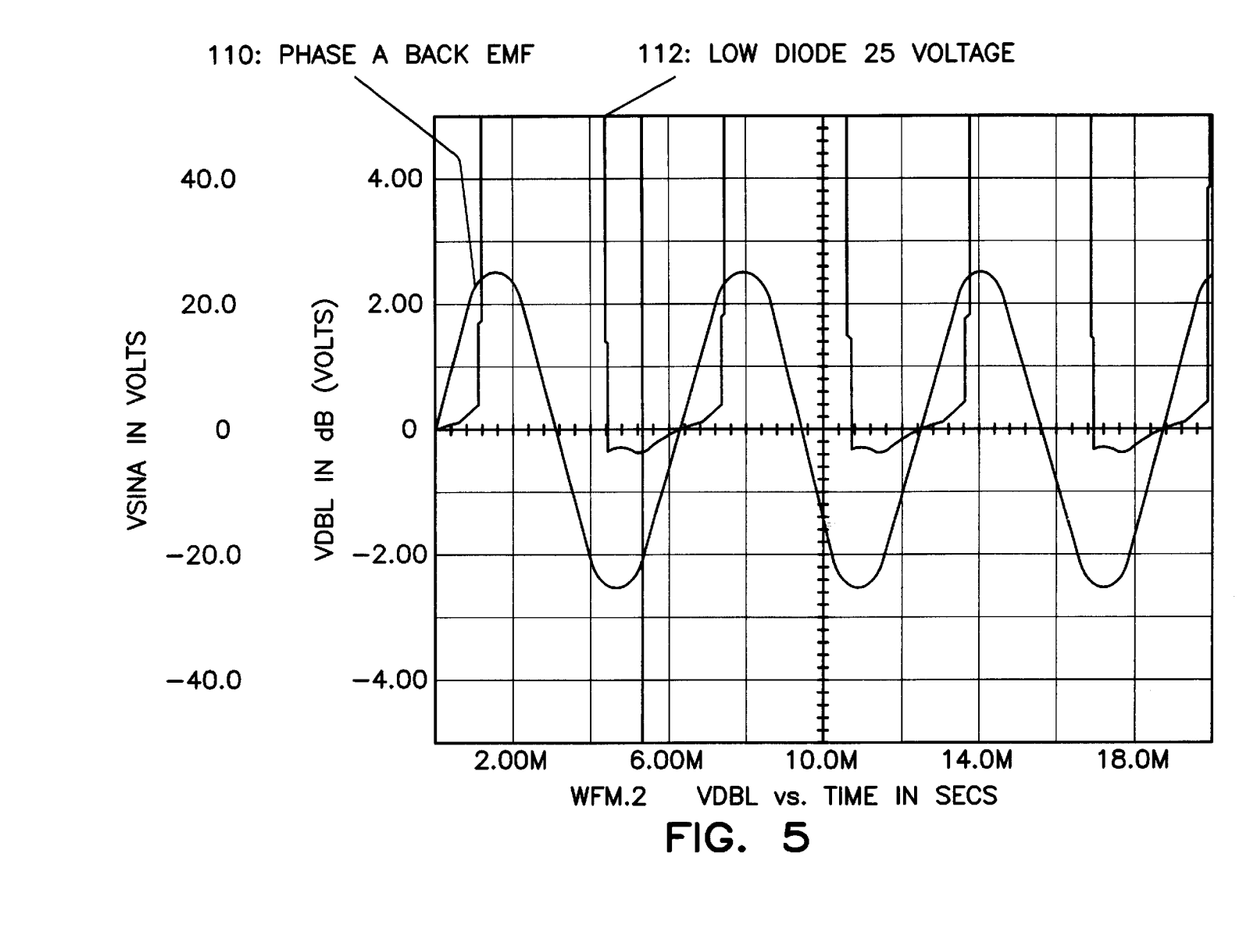
FIG. 5 illustrates generally the relationship between a phase of the back EMF and a voltage across a lower body diode in accordance with the present invention.

The alternator 10 of the present invention uses the zero crossings of the lower MOSFET body diodes to calculate the phase of the back EMF in the alternator. FIG. 5 shows a waveform 110 simulating the phase A back EMF in alternator 10. FIG. 5 also shows a waveform 112 showing the voltage across the body diode of MOSFET 25 (which is connected to output B). Waveform 112 represents the voltage across the lower body diode as the switch 25 is turned on. As can be seen from FIG. 5, when the switch 25 is turned on, the voltage across the body diode goes from slightly less than zero to greater than zero. At the exact instant when the voltage across the body diode goes from negative to positive, the back EMF of phase A goes from negative to positive. Accordingly, the negative to positive zero voltage crossings of the body diode for the lower MOSFET switch connected to output B correspond exactly with the negative to positive zero crossing of the phase A back EMF. Therefore, even though the back EMF can not be directly measured during actual operation of the alternator, the phase A back EMF may be determined by monitoring the negative to positive zero crossings of the body diode of the lower MOSFET switch connected to winding output B. Because it is known that the back EMF is a sinusoidal waveform, the period of the phase A back EMF waveform may be calculated by measuring the time that elapses between two negative to positive zero crossings of the body diode on lower MOSFET switch 25. Also, the microcontroller can determine the exact phase of the phase A back EMF by observing the negative to positive voltage crossing of the lower body diode on MOSFET switch 25 and associating the negative to positive zero crossing of the phase A back EMF with the same zero crossing. Thus, a reference for the phase of the phase A back EMF is established for introducing a phase shift between the phase A back EMF and the phase voltage $V_{AB}$. The zero crossings of the back EMF for phases B and C may also be determined by monitoring the zero crossings of the voltage across body diodes 27 for respective MOSFETs 26 and 24.

Figure 6:
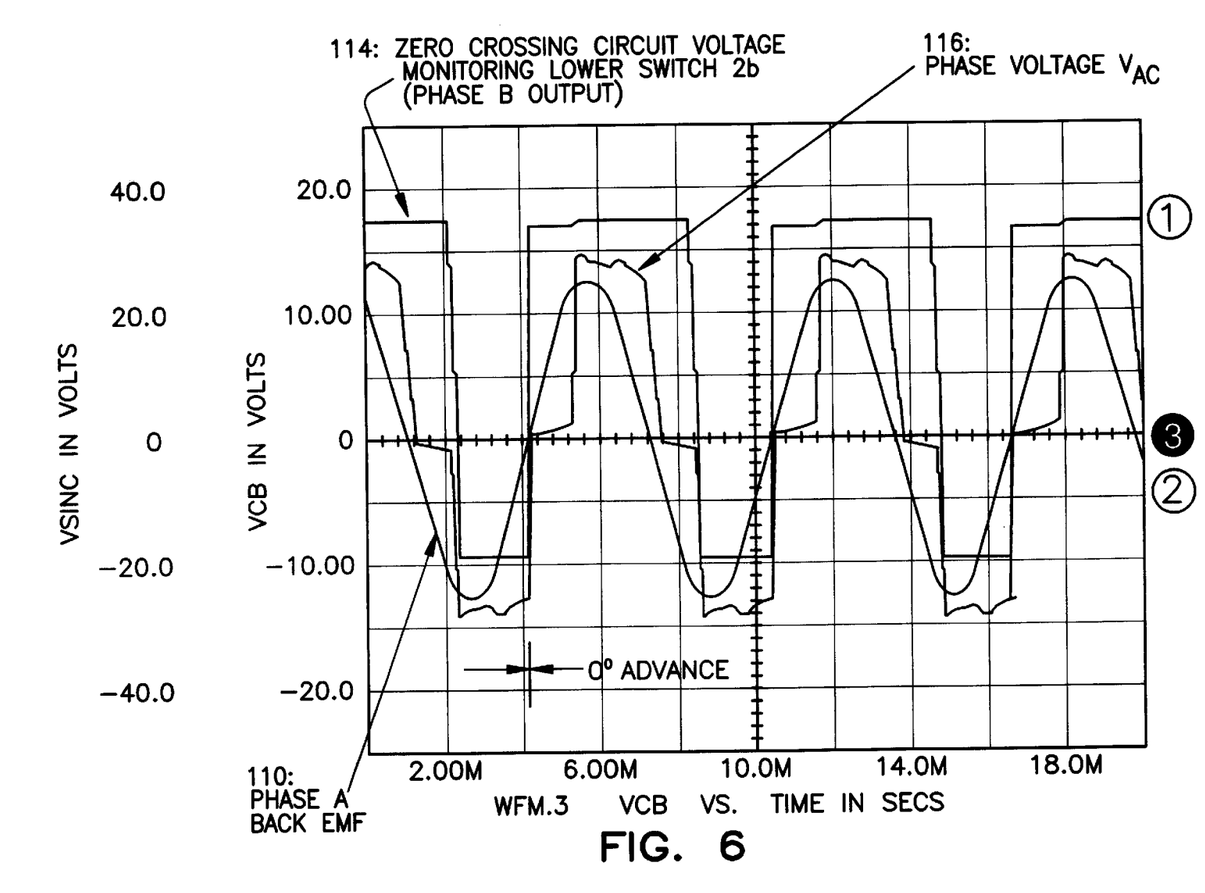
FIG. 6 illustrates the relationship between a phase of the back EMF and the voltage across a lower body diode when a phase delay is introduced by the alternator control of the present invention.

FIG. 6 shows the phase A back EMF waveform 110, also shown in FIG. 5, and the zero crossing detector output waveform 114 which provides an indication of the zero crossings of the voltage across the body diode 27 for lower MOSFET switch 25. FIG. 6 also shows the phase voltage $V_{AC}$ with no power angle introduced between the back EMF and the phase voltage. The zero crossing detector output waveform 114 indicates that the voltage across the body diode 27 for switch 25 goes from negative to positive when the waveform 114 goes from negative to positive. The phase A back EMF waveform 110 also goes from negative to positive at the exact instant that the zero crossing waveform for body diode 27 of switch 25 goes from negative to positive. Knowing that the back EMF waveform 110 is a sinusoidal waveform, the microprocessor may make a determination of the period and precise phase of the back EMF based upon the zero crossing waveform.

The other back EMF phases may be calculated in the same manner as previously described. In particular, the phase B back EMF is determined by monitoring the zero crossing waveform for the body diode of MOSFET switch 26, which is connected to the C output of the stator windings. The phase C back EMF is determined by monitoring the zero crossing waveform for the body diode of MOSFET switch 24, which is connected to the A output of the stator windings. When the zero crossing detector indicates a negative to positive voltage change, the microprocessor knows that the corresponding phase back EMF has also just changed from negative to positive. The period of each phase of the back EMF should be exactly the same.

To confirm that the alternator is operating properly, the microprocessor calculates the time between all negative to positive zero crossings from the zero crossing detector. Each successive negative to positive zero crossing is representative of the negative to positive zero crossings of successive phases of the back EMF. The negative to positive zero crossings should occur ⅓ of a period (or 120°) apart. If the negative to positive pulses are not 120° apart, the microprocessor will know that an error exists in the alternator. Of course, the microprocessor may allow for some small error to occur between the pulses before an error is determined. For example, it may be determined that no error occurs so long as the negative to positive zero crossing pulses are all 120° plus or minus 1° apart.

With a machine reference established for the zero crossings of the back EMF for each phase and the ability to introduce a delay into the phase voltages, it is possible to introduce a power angle phase shift into the alternator and increase alternator output. As previously stated, the power angle is the phase difference between the back EMF and the phase voltage in each of the stator windings. The phase of the back EMF is calculated as described above by monitoring the zero crossings across the body diodes 27 in the lower MOSFET switches 24–26. With knowledge of the exact phase angle of the back EMF, each phase voltage may be delayed as described above by operating the rectifier bridge in the active mode and delaying the turn off and turn on times for each of the MOSFET switches.

Figure 7:
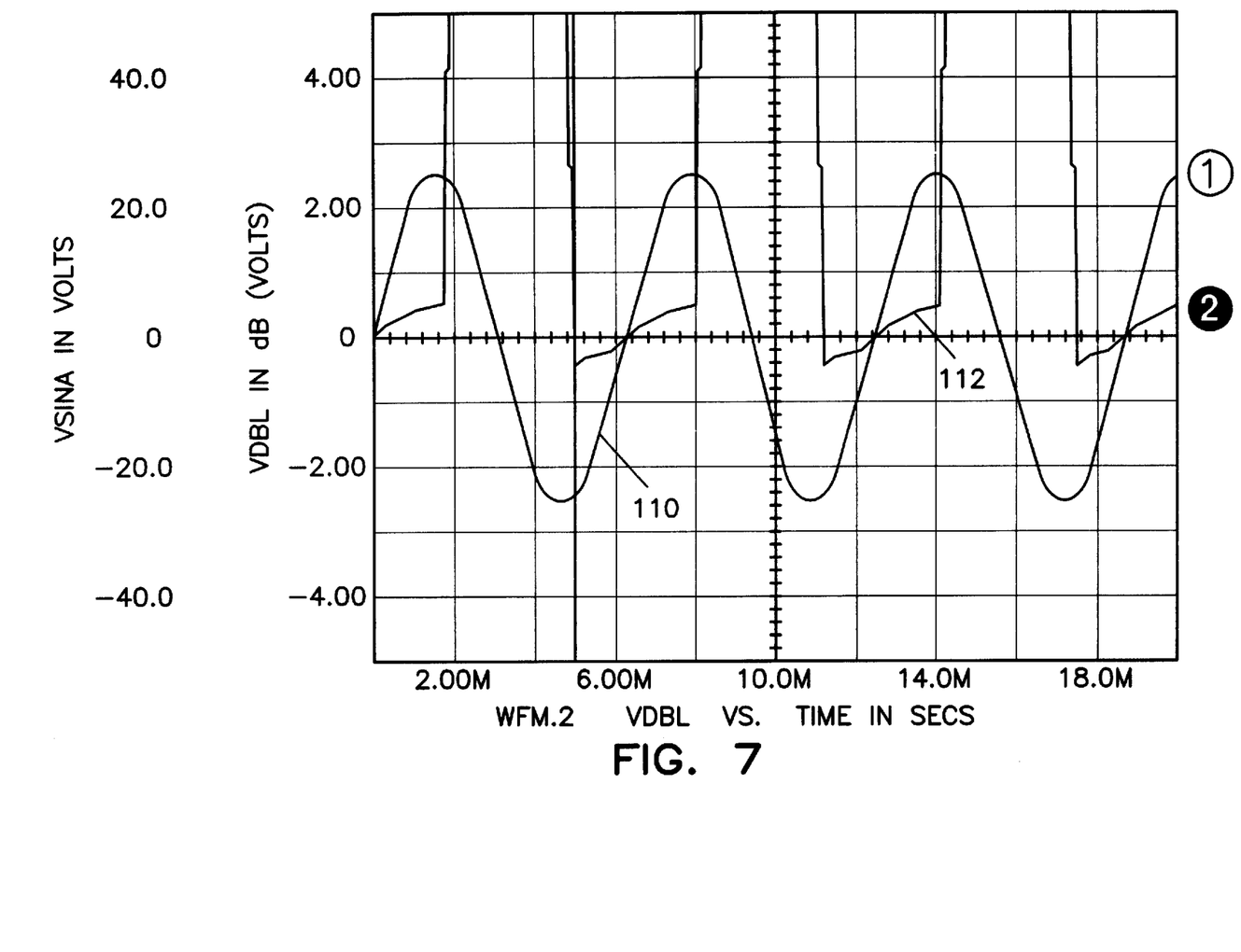
FIG. 7 illustrates generally the relationship between a phase of the back EMF, the output of a zero crossing detector, and a phase voltage.
Figure 8:
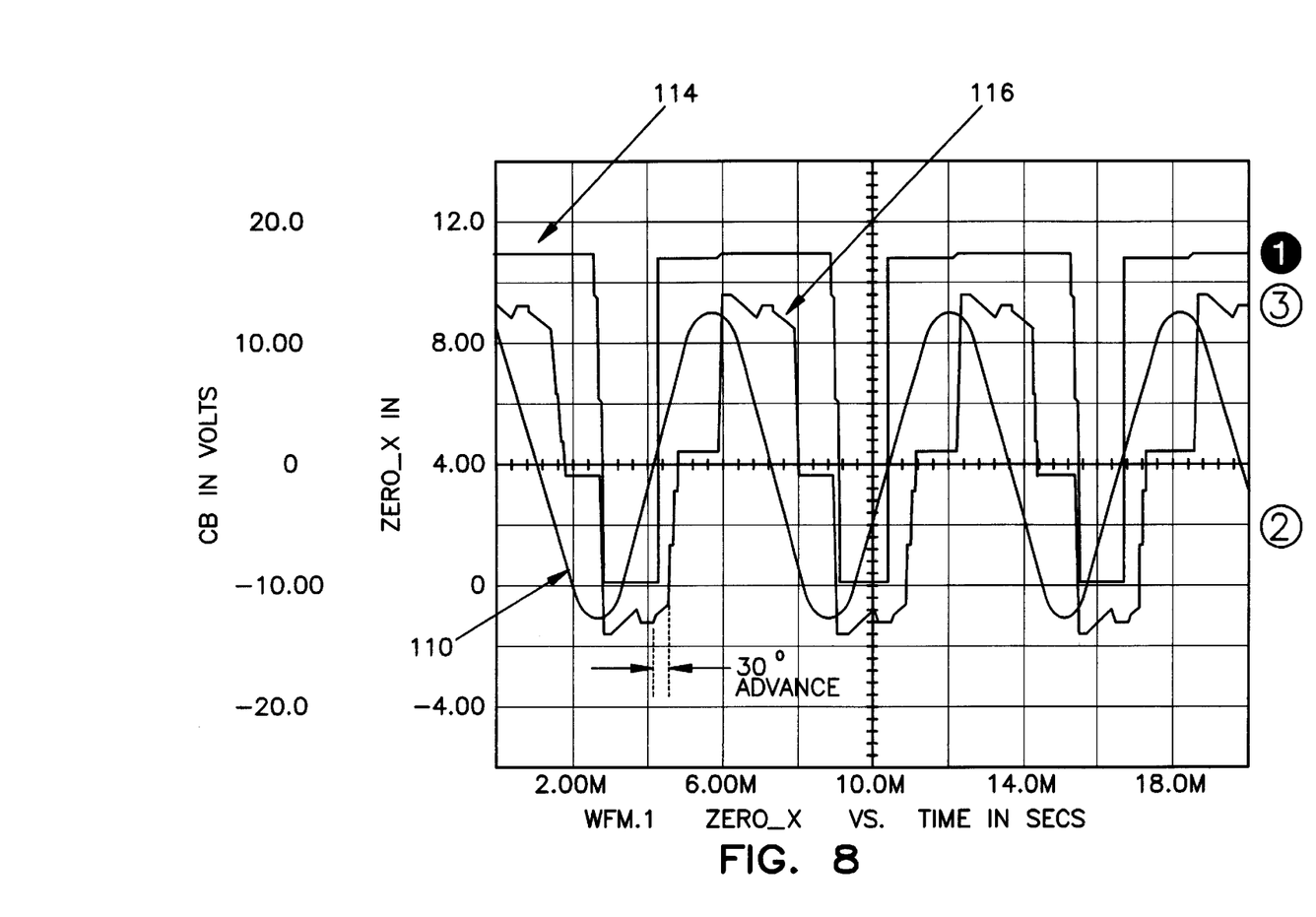
FIG. 8 illustrates the relationship between a phase of the back EMF, the output of a zero crossing detector, and a phase voltage when a phase delay is introduced by the alternator control of the present invention.

FIG. 7 shows a simulation of the phase A back EMF (waveform 110) and the voltage across the body diode of MOSFET 25 (waveform 112). FIG. 7 is similar to FIG. 5, but in FIG. 7 the turn on and turn off time for MOSFET switch 25 is delayed by 30°. Again, the negative to positive zero crossing voltage for body diode of MOSFET switch 25 is aligned with the negative to positive zero crossing for phase A back EMF. The only difference between FIG. 5 and FIG. 7 is that the MOSFET switching is modified during operation of the rectifier bridge 20. Specifically, the switching of each MOSFET switch is delayed by 30° in FIG. 7. The result of this delayed MOSFET switching can be seen in FIG. 8. FIG. 8 shows the same information as displayed in FIG. 6, but with a 30° phase advance in phase voltage $V_{AB}$, resulting from the delayed switching of the MOSFET switches. The 30° phase advance in phase voltage $V_{AB}$ results in a power angle shift of 30° between the phase A back EMF shown by waveform 110 and phase voltage $V_{AB}$ shown by waveform 116. A comparison of FIG. 6 and FIG. 8 shows that delayed MOSFET switching results in a shift to the right, i.e., a "phase delay" for waveform 116. Accordingly, by information provided to the microcontroller about the voltage of the body diodes in the lower MOSFET switches, the microcontroller is capable of controlling the rectifier bridge 20, and introducing a power angle phase shift to improve alternator output.

Figure 9:
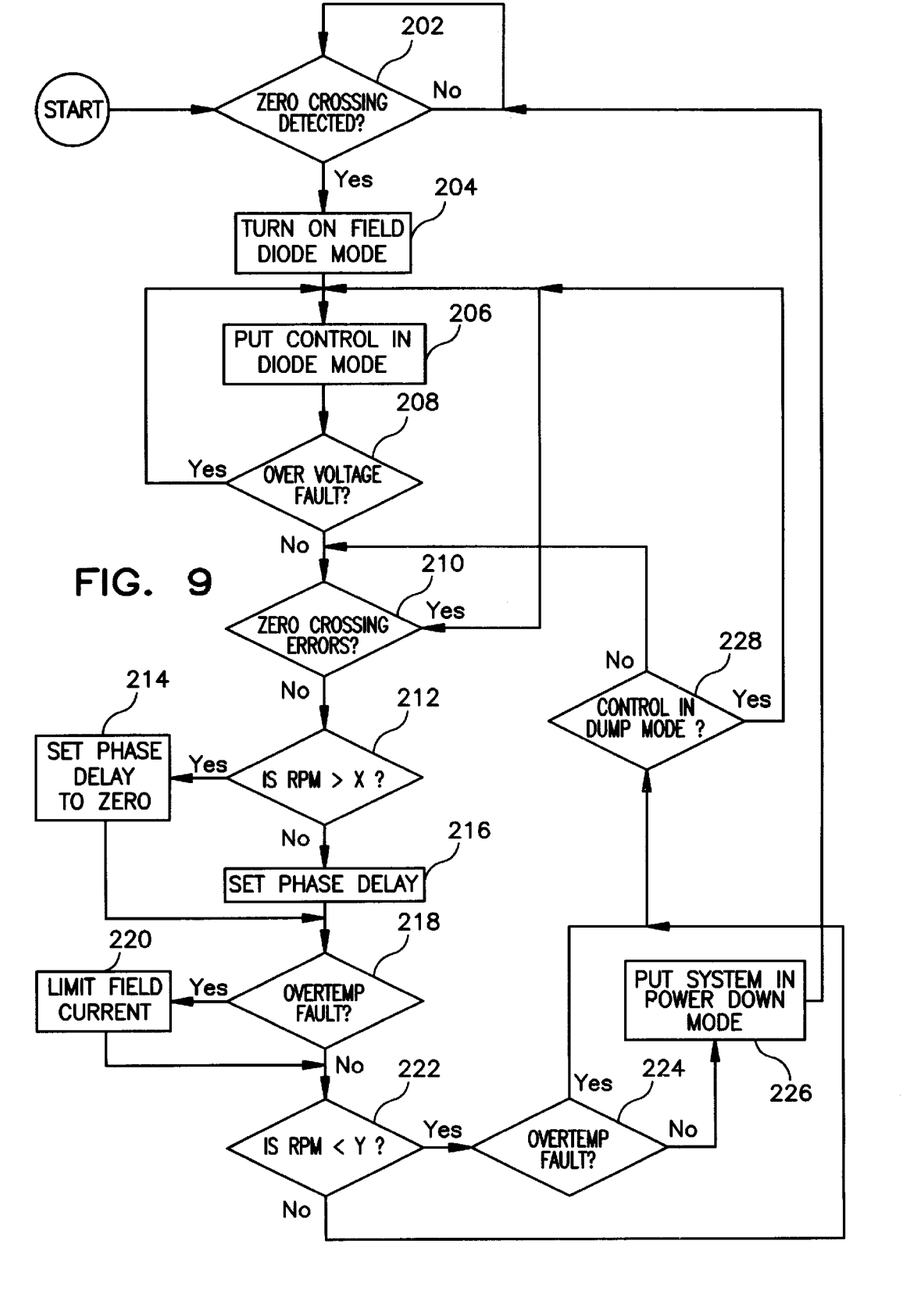
FIG. 9 shows a block diagram of a flow chart showing a method of controlling an alternator according to the present invention.

Operation of the alternator 10 is described with referenced to FIG. 9, showing a flowchart of microcontroller operations. As indicated in step 202, when the system is initially in a powered down state and the vehicle engine is not operational, the microcontroller waits for a signal from the zero crossing detector. Upon receipt of a zero crossing signal to indicate that the engine is running and the alternator is operational, the microcontroller turns on the field control as indicated in step 204. Operation of the field control includes monitoring the B+ voltage at terminal 30a and determining if a greater output is required. If a greater output is required, the microcontroller operates the rotor field gate drive 72 to allow more current to flow through the regulator 70 and the field winding 12. As more current flows through the field winding, a greater output is realized from the alternator.

Next, in step 206, the microcontroller directs the three phase gate driver to operate the rectifier bridge in the diode mode with all of the MOSFET switches turned off so that the rectifier is operated with only the body diodes of the MOSFET switches. Following step 206, the microcontroller polls the over voltage detector 80, to determine if there is a voltage spike at the battery terminals. If an over voltage condition exists, the rectifier continues to run in the rectifier in the diode mode.

If there is no over voltage fault from the over voltage detector, the microcontroller moves on to step 210 and checks for zero crossing errors. A zero crossing error occurs when the difference between any two zero crossings for successive phases of the back EMF is different from ⅓ of the back EMF period (or 120°) plus or minus an error amount. The microprocessor calculates the back EMF period by measuring the time between two negative to positive zero crossings for a single back EMF phase. Then, in order for no zero crossing errors to occur, negative to positive zero crossing signals must occur within 120° plus or minus the error amount for each successive phase of the back EMF. If zero crossing errors are present, the microcontroller operates the rectifier bridge in the diode mode. If no zero crossing errors are present, the microcontroller begins to operate the rectifier bridge in an active bridge mode, starting at step 212.

Once in the active bridge mode at step 212, the microcontroller operates the rectifier bridge according to the six step control described above. This six step control increases the efficiency of the rectifier bridge 20 because of lower conduction losses in the MOSFET switches as compared to the diodes alone.

In step 212, the microcontroller determines the speed at which the rotor is turning based on the number of zero crossings per second reported by the zero crossing detector. This speed can be determined because the frequency of the back EMF is a function of rotor speed. If the rotor is spinning above a given number of revolutions per minute, for example 3500 rpm, the microcontroller knows that sufficient power to drive the vehicle load is being output from the alternator, and no phase advance is introduced, as shown in step 214. However, if the rotor is spinning at an idling speed (e.g., less than 3500 revolutions per minute), the microcontroller anticipates that greater power should be delivered to the vehicle load. As shown in step 216, in order to maximize the power delivered to the vehicle load when the rotor is spinning at an engine idle speed, the microcontroller introduces a power angle to the alternator by incorporating a pre-determined phase delay in the phase voltages. As discussed earlier, a phase delay in the phase voltages may be introduced by causing the on/off states of the MOSFET switches in the six step control sequence to be slightly delayed. The microcontroller has a machine reference for the phase of the back EMF by the negative to positive zero crossing information provided by the zero crossing detector. With a reference for the exact phase of the back EMF, the microcontroller delays the on/off timing of the MOSFET switches based on the phase of the EMF. By delaying MOSFET switching, a pre-determined a phase delay is provided in the phase voltages, and a shifted power angle is established between the phase voltages and the phases of the back EMF. Accordingly, increased power is delivered from the alternator to the vehicle load during engine idling.

After adjusting the power angle in the alternator, the microprocessor moves to step 218 and checks for any temperature faults reported by the thermistor interfaces. If increased temperatures exist in the alternator, the microcontroller limits the field current in step 220 in an attempt to reduce the increased temperatures.

If the alternator temperature is acceptable, the microcontroller again checks the revolutions of the rotor per minute in step 222. If the revolutions of the rotor have dropped below a speed suggesting that the engine is shutting off, (e.g., 800 rpm) the microcontroller again checks for zero crossings in step 224. If no zero crossings are detected, the engine has been shut off and the system is placed in a power down mode.

If zero crossings are detected in step 224, or if the revolutions of the rotor do not suggest that the engine is below idling speed in step 222, the microprocessor checks in step 228 to see if the alternator is being operated in a dump mode by optional alternator hardware. If the alternator is being operated in dump mode the microprocessor resets the alternator into the diode mode. If the alternator is not being operated in dump mode, the microprocessor returns to step 210 and looks for any zero crossing errors. As long as no zero crossing errors are present, the microprocessor loops through steps 210 to 228 again, continuing to operate the alternator in the active bridge mode.

Those of skill in the art will appreciate that many changes could be made to the embodiments described herein without departing from the spirit and scope of the inventions. By way of example, the microcontroller may be programmed to incrementally adjust the power angle rather than implementing a pre-determined power angle. As another example, the zero crossing detection may be implemented using only one or two phases instead of all three phases. Additional changes will be readily apparent to those of skill and the art, and the invention, as described in the claims, should not be limited to the embodiments shown.

What is claimed is:

1. An alternator driven by an engine, the alternator comprising:
   a. three phase stator windings having three stator winding outputs;
   b. a rotor having a rotor field winding magnetically coupled to said stator windings and driven by the engine to generate a back EMF in said stator windings and electrical current at said three stator winding outputs;
   c. a rectifier bridge having a dc output comprising a plurality of transistor switches, said plurality transistor switches comprising at least three pairs of connected upper transistor switches and lower transistor switches and each of said plurality of transistor switches including body diodes bridging said transistor switches, wherein each of said three stator winding outputs are electrically connected to said rectifier bridge between a respective pair of said upper transistor switches and said lower transistor switches;
   d. a zero crossing detector connected to said three stator winding outputs, said zero crossing detector operable to determine the zero voltage crossings across at least one of said body diodes of said transistor switches and generate a signal indicative of said zero voltage crossings, wherein said zero voltage crossings across at least one of said body diodes are representative of zero crossings of said back EMF in said stator windings;
   e. a microcontroller connected to said zero crossing detector, said microcontroller for receiving said signal indicative of said zero voltage crossings from said zero crossing detector and controlling the operation of said transistor switches in said rectifier bridge to control the phase angle of phase voltages at said three stator winding outputs and introduce a phase shift between said phase voltages and said back EMF.

2. An alternator as claimed in claim 1 wherein said microcontroller can control said rectifier bridge to operate in two differing modes, a first mode where said transistor switches are turned off and only said body diodes rectify said electrical current from said stator windings and a second mode where said transistor switches are operated in a predetermined sequence to increase the efficiency of said rectifier bridge.

3. An alternator as claimed in claim 2 wherein said microcontroller controls said transistor switches of said rectifier bridge in said second mode according to a predetermined six step control sequence such that the transistor switches are turned on and off sequentially so as to control the phase angle of phase voltages at said three stator winding outputs and introduce a phase shift between said phase voltages and said back EMF.

4. An alternator as claimed in claim 1 also comprising an over voltage detector to determine if a predetermined voltage is exceeded at the output of said rectifier bridge and to provide a signal to said microcontroller indicative of the over voltage so that said microcontroller controls the rectifier bridge output voltage.

5. An alternator as claimed in claim 1 also comprising:

f. temperature sensors which sense temperature at predetermined locations of said alternator and said microcontroller controls the current to said rotor field winding to reduce said current if said temperature sensors sense temperatures exceeding a predetermined level.

6. The alternator of claim 1 wherein said transistor switches are MOSFET switches.

7. The alternator of claim 1 wherein said power angle is maintained at a predetermined value to increase alternator output current.

8. The alternator of claim 1 wherein said power angle is continuously adjusted by said microcontroller, dependant upon alternator current at the dc output.

9. The alternator of claim 1 wherein the engine is a motor vehicle engine and said dc output is connected to a vehicle electrical load of said motor vehicle.

10. A method of operating an alternator having a three phase stator winding with three stator outputs connected to a controlled full wave rectifier bridge having a dc output and including a plurality of transistor switches with body diodes connected across each of said transistor switches, wherein a back EMF is generated in each of the three phase stator windings and phase voltages are generated at the three stator winding outputs, the method comprising the steps of:

a. sequentially controlling each of the plurality of transistor switches according to a predefined control sequence;

b. monitoring the occurrence of zero voltage crossings across the body diodes in the full wave rectifier bridge, the zero voltage crossings representing the zero crossings of the back EMF generated in the stator winding; and c. further controlling each of the plurality of transistor switches by introducing a time delay in the control sequence, said time delay resulting in phase shifts in the phase voltages and thereby introducing a power angle between the phase of the back EMF and the phases of the phase voltages.

11. The method of claim 10 wherein the plurality of transistor switches include at least three pairs of connected upper transistor switches and lower transistor switches and wherein the step of monitoring the occurrence of zero voltage crossings across the body diodes involves monitoring the zero voltage crossings of the body diodes in the lower transistor switches.

12. The method of claim 11 wherein the transistor switches are MOSFET switches.

13. A method of calculating the position of one phase of a three phase back EMF generated in a three phase stator winding of a vehicle alternator, the three phase stator winding having three stator winding outputs connected to a controlled bridge rectifier driven by a microcontroller, the controlled bridge rectifier comprising three upper transistor switches with body diodes connected across the upper transistor switches and three lower transistor switches with body diodes connected across the lower transistor switches, the upper transistor switches respectively connected to a respective one of said lower transistor switches to form three pairs of upper and lower transistor switches, the method comprising the steps of:

a. providing a zero crossing detector to monitor zero voltage crossings across said body diodes of said lower transistor switches;

b. delivering a signal indicative of said zero voltage crossings across said body diodes to the microcontroller;

c. associating a sinusoidal waveform with a phase of the back EMF and associating the zero voltage crossings across one of said body diodes with the zero crossings of said phase of the back EMF.

14. The method of claim 13 wherein the transistor switches are MOSFETs.

15. The method of claim 10 further comprising the step of determining a period of the back EMF and monitoring for zero crossing errors by calculating whether any two successive zero voltage crossings across said body diodes in the full wave rectifier bridge occur within an error amount of $\frac{1}{3}$ of said back EMF period.

16. The alternator of claim 1 wherein said zero crossing detector is operable to determine the zero voltage crossings across said body diodes of said lower transistor switches.

* * * * *